United States Patent [19]
Pisterzi

[11] Patent Number: 6,144,998
[45] Date of Patent: Nov. 7, 2000

[54] SUBSCRIBER SYSTEM FOR INTERACTIVE INTERFACING WITH BROADCAST INFORMATION

[75] Inventor: Michael J. Pisterzi, Plano, Tex.

[73] Assignee: Alcatel USA Sourcing, L.P., Plano, Tex.

[21] Appl. No.: 09/056,590

[22] Filed: Apr. 7, 1998

[51] Int. Cl.[7] ................................................ H04N 7/10
[52] U.S. Cl. .............................. 709/219; 348/8; 455/3.3
[58] Field of Search .............................. 348/6, 8, 10, 12; 455/3.3, 6.2, 6.3; 340/310.01–310.08; 709/219

[56] References Cited

U.S. PATENT DOCUMENTS

| | | |
|---|---|---|
| Re. 35,774 | 4/1998 | Moura et al. . |
| 5,327,230 | 7/1994 | Dockery ...................................... 348/8 |
| 5,347,304 | 9/1994 | Moura et al. . |
| 5,586,121 | 12/1996 | Moura et al. . |
| 5,892,795 | 4/1999 | Paret ...................................... 375/222 |
| 5,982,363 | 11/1999 | Naiff ...................................... 345/327 |

FOREIGN PATENT DOCUMENTS

| | | |
|---|---|---|
| 0822721 | 2/1998 | European Pat. Off. ....... H04N 7/173 |
| WO 92/11717 | 7/1992 | WIPO . |

OTHER PUBLICATIONS

N. Ohta, et al., "Regional Community Network System", IEICE Transactions on Communications, vol. E79–B, No. 7, Jul. 1996, pp. 890–898.

*Primary Examiner*—Nathan Flynn
*Assistant Examiner*—Ngoc Vu
*Attorney, Agent, or Firm*—Baker Botts L.L.P.

[57] ABSTRACT

A subscriber system (10) includes a dual network interface module (12). The dual network interface module (12) includes slots for a video unit (20) and a bandwidth unit (22). The video unit (20) receives broadcast information from a service provider (24) for ultimate display and viewing by a subscriber at the subscriber system (10). The bandwidth unit (22) provides an interface to a telecommunications network (30) through a telecommunications element (28). The dual network interface module (12) also includes an AC carrier modem (32) that receives and sends information to a processor device (34) over existing AC power lines within the subscriber system (10). In this manner, interactive interfacing of broadcast information received at the video unit (20) can be performed at the processor device (34) through the bandwidth unit (22) and over the telecommunications network (30) on a real time basis. The use of an existing subscriber link (26) and the AC power lines within the subscriber system (10) allows for a cost effective and efficient technique for providing interactive services to subscribers connected to an existing telephone backbone.

9 Claims, 1 Drawing Sheet

SUBSCRIBER SYSTEM FOR INTERACTIVE INTERFACING WITH BROADCAST INFORMATION

TECHNICAL FIELD OF THE INVENTION

The present invention relates in general to broadcast and telecommunications services and more particularly to a subscriber system for interactive interfacing with broadcast information.

BACKGROUND OF THE INVENTION

Service providers offer various types of video broadcast programming to subscribers, such as cable television programming or satellite television programming. Most of this programming is offered over a unidirectional link from the service provider to the subscriber. As levels of services provided by service providers increase and improve, programming scenarios may exist that require interaction between the programming being offered and the subscriber receiving the programming. However, the unidirectional link over which programming is offered does not provide for interaction required for enhanced interactive programming sessions. Therefore, it is desirable to provide a cost effective interactive capability with programming services provided over a unidirectional link.

SUMMARY OF THE INVENTION

From the foregoing, it may be appreciated that a need has arisen for an efficient interactive capability compatible with existing unidirectional link programming provided by conventional service providers.

According to an embodiment of the present invention, there is provided a subscriber system for interactive interfacing with broadcast information that includes a dual network interface module having a video unit, a bandwidth unit, and an AC carrier modem. The video unit receives broadcast information from a broadcast service provider for display to and viewing by a subscriber. The bandwidth unit receives and transmits telecommunications signals over a subscriber link with a telecommunications network. The AC carrier modem receives and transmits information from and to the video unit and the bandwidth unit over premises AC power lines. A processor device communicates with the AC carrier modem over the premises AC power lines. The processor device provides an interactive gateway through the AC carrier modem and the bandwidth unit to the telecommunications network for interactive interfacing with the broadcast information received by the video unit.

The present invention provides various technical advantages over conventional service provider information exchange techniques. For example, one technical advantage is in providing an interactive capability with information provided by service providers over a unidirectional link. Another technical advantage is to provide an interface for the received broadcast information with a telecommunications network in order to facilitate the interactive capability. Yet another technical advantage is in using existing facilities at the subscriber to provide the interactive capability. Other technical advantages may be readily ascertainable by those skilled in the art from the following figure, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which:

The FIGURE is a block diagram of a subscriber system.

DETAILED DESCRIPTION OF THE INVENTION

Figure 1:
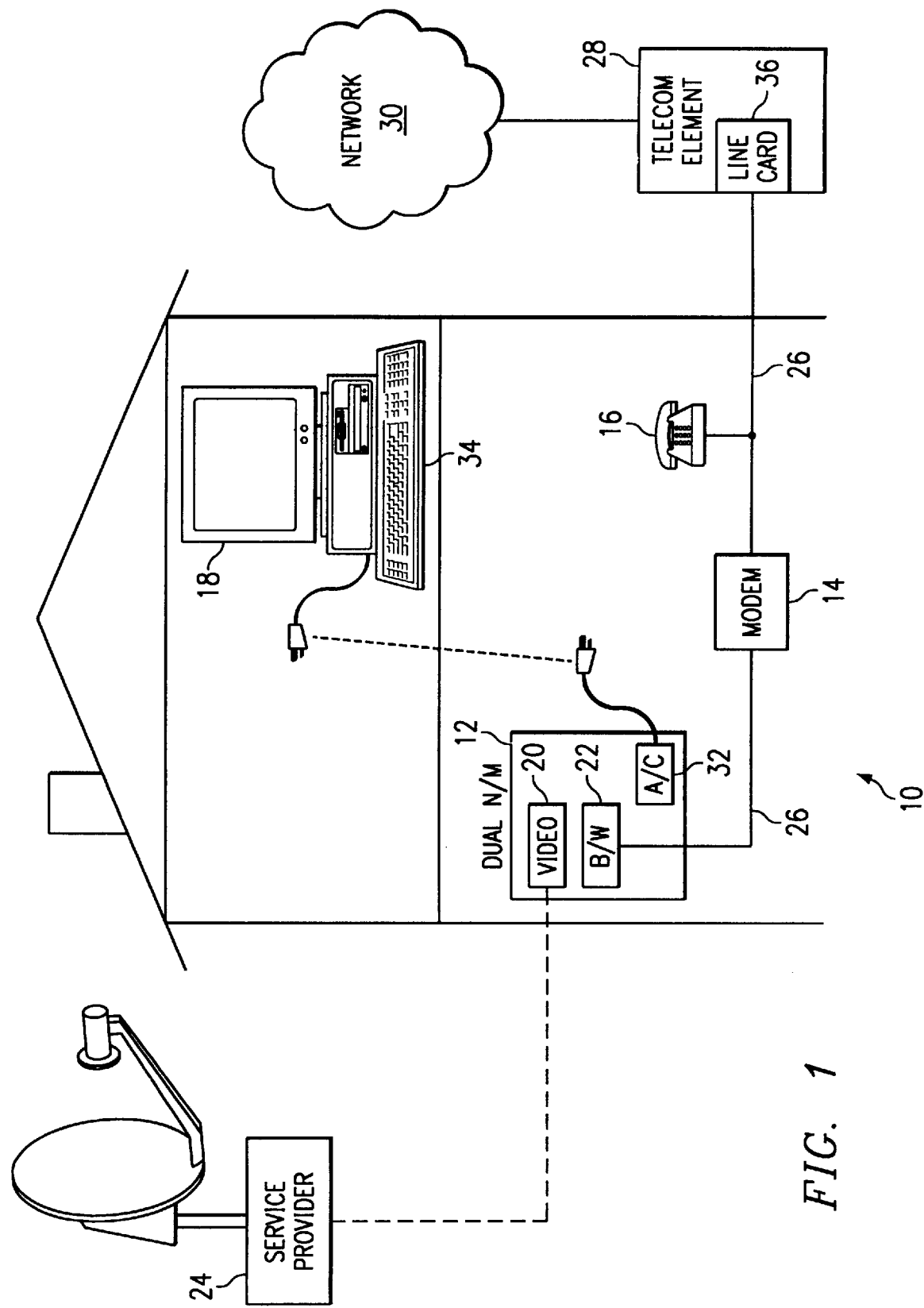

The Figure is a block diagram of a subscriber system 10. Subscriber system 10 includes a dual network interface module 12, an optional modem unit 14, a subscriber telephone set 16, and a computer interface 18. Dual network interface module 12 includes a video unit 20 and a bandwidth unit 22. Video unit 20 receives information signals, preferably video/audio signals, from a service provider 24. Service provider 24 may include a direct broadcast satellite service, a cable television service, an Internet service provider, and any of a variety of conventional unidirectional information service providers. Video unit 20 preferably allows for the display and viewing of received information signals on a television or monitor device. Bandwidth unit 22 receives and transmits telecommunications signals over a subscriber link 26. Subscriber link 26 couples bandwidth unit 22 to a telecommunications element 28, for example a digital loop carrier system, within a telecommunications network 30. Bandwidth unit 22 provides additional bandwidth capability for dual network interface module 12 and upstream payload and signaling communications.

Dual network interface module 12 sends and receives information to a subscriber within subscriber system 10 through an AC carrier modem 32. AC carrier modem 32 provides the capability to interface with a computer or other processor device 34 within subscriber system 10 by exchanging information over the AC power lines within subscriber system 10. Processor device 34 may include its own built-in AC carrier modem or receive and transmit information through a stand alone modem unit. Processor device may include the capabilities of conventional in-home telephone units to include displaying caller identification information and speaker phone capability.

This ability to exchange information between dual network interface module 12 and processor device 34 through use of existing AC wiring eliminates the need for further premises wiring in order to provide a direct connection between processor device 34 and dual network interface module 12. Through the AC power line transfer of information and the interfaces that dual network interface module 12 provides with unidirectional service providers and the telecommunications networks, a subscriber has the ability to interact over telecommunications network 30, in conjunction with bandwidth unit 22 and subscriber link 26, with the information provided through video unit 20 on a real time basis. Interactive services can be immediately implemented for a subscriber with existing telephone plant facilities and in-home power wiring with minimal installation.

Bandwidth unit 22, being connected to telecommunications network 30 through subscriber line 26, may also incorporate a high speed appliance function to facilitate access to an Internet service provider or information service provider over telecommunications network 30. Bandwidth unit 22 and video unit 20 may be incorporated as plug-in cards that slide into slots of dual network interface module 12. The high speed appliance function may also be incorporated onto a separate plug-in card. Bandwidth unit 22 may support any of a variety of protocols carried over subscriber link 26, including asymmetrical digital subscriber line (ADSL), high bit rate digital subscriber line (HDSL), very high bit rate digital subscriber line (VDSL), and other conventional protocol types. Other information that may be carried on subscriber link 26 include video on demand, local broadcast, personal computer data, and plain old telephone services.

Telecommunications element 28 may include a line card 36 coupled to subscriber link 26. Line card 26 may provide an interface to the ADSL protocol or other protocol types as previously discussed. Subscriber system 10 may include modem unit 14 to provide an interface to and from line card 36. Modem unit 14 may be a stand alone unit as shown or may be incorporated into bandwidth unit 22.

Thus, it is apparent that there has been provided, in accordance with the present invention, a subscriber system for interactive interfacing with broadcast information that satisfies the advantages set forth above. Although the present invention has been described in detail, it should be understood that various changes, substitutions, and alterations readily ascertainable by those skilled in the art may be made herein without departing from the spirit and scope of the present invention as defined by the following claims.

What is claimed is:

1. A subscriber system for interactive interfacing with broadcast information, comprising:

a dual network interface module having a video unit, a bandwidth unit, and an AC carrier modem, the video unit operable to receive broadcast information from a broadcast service provider for display to and viewing by a subscriber, the bandwidth unit operable to receive and transmit telecommunications signals over a subscriber link with a telecommunications network, the AC carrier modem operable to receive and transmit information over premises AC power lines;

a processor device operable to communicate with the AC carrier modem over the premises AC power lines, the processor device operable to provide an interactive gateway through the AC carrier modem and the bandwidth unit to the telecommunications network for interactive interfacing with the broadcast information received by the video unit.

2. The subscriber system of claim 1, wherein the bandwidth unit includes an appliance function to provide access to an information service provider from the telecommunications network for the processor device.

3. The subscriber system of claim 2, wherein the information service provider provides access to Internet based information for the processor device.

4. The subscriber system of claim 1, wherein the broadcast information received by the video unit from the broadcast service provider includes digital broadcast satellite television signals, cable television signals, and Internet access signals.

5. The subscriber system of claim 1, wherein the bandwidth unit is operable to support asymmetrical digital subscriber line, high bit rate digital subscriber line, or very high bit rate digital subscriber line, protocols on the subscriber link.

6. The subscriber system of claim 1, wherein the bandwidth unit provides additional bandwidth capability to the dual network interface module in order to handle upstream payload and signaling capabilities.

7. The subscriber system of claim 1, wherein the subscriber link is operable to carry telecommunications services provided by the telecommunications network for access by the bandwidth unit.

8. The subscriber system of claim 7, wherein the telecommunications services include video on demand, local broadcast information, plain old telephone service, Internet access, and data capability.

9. The subscriber system of claim 1, wherein the processor device includes a means to display caller identification information and means to provide a speaker phone capability.

* * * * *